(12) United States Patent
Clement et al.

(10) Patent No.: US 7,240,470 B2
(45) Date of Patent: Jul. 10, 2007

(54) DRIVE OVER MOWER DECK

(75) Inventors: Brian Richard Clement, Grovetown, GA (US); Thomas John Deves, Evans, GA (US); Robert Neil Fox, Appling, GA (US); Harlin James Trefz, Jackson, TN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/186,335

(22) Filed: Jul. 21, 2005

(65) Prior Publication Data

US 2007/0028577 A1 Feb. 8, 2007

(51) Int. Cl.
*A01D 34/00* (2006.01)
(52) U.S. Cl. ....................................................... 56/17.2
(58) Field of Classification Search ................. 56/17.2, 56/16.7, 208, DIG. 3, DIG. 22, 17.1; 37/270; 16/35 D; D15/17, 27
See application file for complete search history.

(56) References Cited

U.S. PATENT DOCUMENTS

| 4,829,754 | A | * | 5/1989 | Shimamura et al. | ......... 56/15.9 |
| 4,977,733 | A | | 12/1990 | Samejima et al. | |
| 5,018,344 | A | * | 5/1991 | Samejima et al. | ........... 56/13.3 |
| 5,020,308 | A | * | 6/1991 | Braun et al. | .................. 56/11.3 |
| 5,177,942 | A | * | 1/1993 | Hager et al. | .................. 56/11.6 |
| 5,203,149 | A | * | 4/1993 | Youngberg et al. | .......... 56/14.9 |
| 5,355,664 | A | * | 10/1994 | Zenner | ........................ 56/15.8 |
| 5,410,865 | A | | 5/1995 | Kurohara et al. | |
| 5,816,035 | A | * | 10/1998 | Schick | ......................... 56/15.2 |
| 6,205,754 | B1 | * | 3/2001 | Laskowski | ................... 56/15.1 |
| 6,276,119 | B1 | * | 8/2001 | Oshima et al. | .............. 56/17.1 |
| 2004/0006959 | A1 | | 1/2004 | Samejima et al. | |

* cited by examiner

*Primary Examiner*—Árpád Fábián Kovács

(57) ABSTRACT

A drive over mower deck has a top surface with downwardly depending surfaces defining a front edge, a back edge, and left and right side edges, at least one belt shield over the top surface, a first pair of gauge wheels mounted adjacent the front edge the deck, and a second pair of gauge wheels mounted adjacent the back edge of the deck. Each pair of gauge wheels is movable vertically to at least one position above the ground surface such that the mower deck is supported by the front edge, back edge, and left and right side edge. Each gauge wheel being releasably lockable at a plurality of different positions.

11 Claims, 4 Drawing Sheets

DRIVE OVER MOWER DECK

FIELD OF THE INVENTION

This invention relates generally to tractors and utility vehicles used for agricultural work and lawn care, and particularly to mower decks carried by such tractors or vehicles that cover rotary cutting blades. More specifically, the invention relates to a drive over mower deck that may be easily attached and removed from a tractor or vehicle.

BACKGROUND OF THE INVENTION

Tractors and utility vehicles used for agricultural work and lawn care may carry a mid-mounted mower deck covering two or more rotary cutting blades on the lower ends of vertically oriented spindles. A mower deck may be attached to a tractor or other vehicle with mechanical linkages that allow the deck to be carried at a range of different cutting heights, and raised or lowered between each height. The blade spindles may be rotated by one or more belts and pulleys above the surface of the deck, which may be driven by an engine and/or power take off shaft. The deck perimeter may have several anti-scalp wheels and/or caster wheels, also referred to as gauge wheels.

Mower decks commonly are attached to the frame of a tractor or utility vehicle at a position between the front and rear wheels. Often it is desirable to remove a mid-mounted mower deck in order to service the unit or store it while using other implements. These types of mower decks are difficult to remove from the tractor or vehicle due to the high weight of the deck and the proximity of the deck to tires and other parts of the tractor or vehicle.

Several steps are needed to remove a mid-mounted mower deck from a tractor or vehicle. First, the mower deck must be disconnected from the mechanical linkages that are part of the mower lift system. Then, the operator must start the tractor and raise the lift system to clear the mower. The operator also must turn the tractor or vehicle's front wheels fully to the left to give the mower deck maximum clearance. Next, the operator must disconnect the driveshaft from the mower deck. Once the driveshaft is disconnected, the gauge wheels must be turned to the sideways position. In some instances, it even may be necessary to remove the mower deck's gauge wheel(s) and its mounting bracket in order to provide enough clearance to slide out the mower deck from under the tractor or vehicle. Once everything has been disconnected and adequate clearance has been achieved, the operator must manually pull the mower deck from under the tractor or vehicle.

When the operator is ready to use the mower deck again, reinstallation may be more difficult than removal of the mower deck. Various mounting points must be aligned. For example, holes in the lift system must be realigned with the holes on the mower deck in order to reinstall the retaining pins. The mower deck must be manually positioned between the front and rear wheels of the tractor or vehicle, and then pushed or pulled under the tractor or vehicle into the desired position where it may be connected to the lift system linkage. The difficulty of reinstallation may be due at least in part to the heavy weight of the deck, the resistance of the gauge wheels supporting the deck to lateral movement, obstructions under the tractor such as a front wheel drive shaft, and irregular ground surfaces.

A mid-mounted mower deck is needed that can be installed or uninstalled from a tractor or other vehicle without pushing or pulling it under the side of the tractor or vehicle. A mid-mounted mower deck is needed that can reduce the difficulty of aligning mounting points to connect the deck to a lift system.

SUMMARY OF THE INVENTION

The invention provides a drive over mower deck that can be quickly and easily mounted or removed from a tractor between the tractor's front and rear wheels. To drive over the mid-mounted mower deck, the deck may be lowered to a position flat on the ground. This is done to prevent damage of caster wheels, brackets other related components that cannot bear the additional weight of the tractor or vehicle during the drive over procedure. The working components of the deck are protected by a drive over belt shield from the weight of the tractor or vehicle applied when the front or rear tires drive over the deck.

The invention also provides a mechanism for lowering a mower deck to the drive over position lying flat on the ground, as well as raising the mower deck to a cutting height. The mechanism includes a pin that sets the gauge wheel height that may be operated using a cam lever. The invention also may provide a lift system that allows connection to a drive over mower deck with minimal manipulation of the mower deck by the operator.

DESCRIPTION OF THE PREFERRED EMBODIMENT

Figure 1:
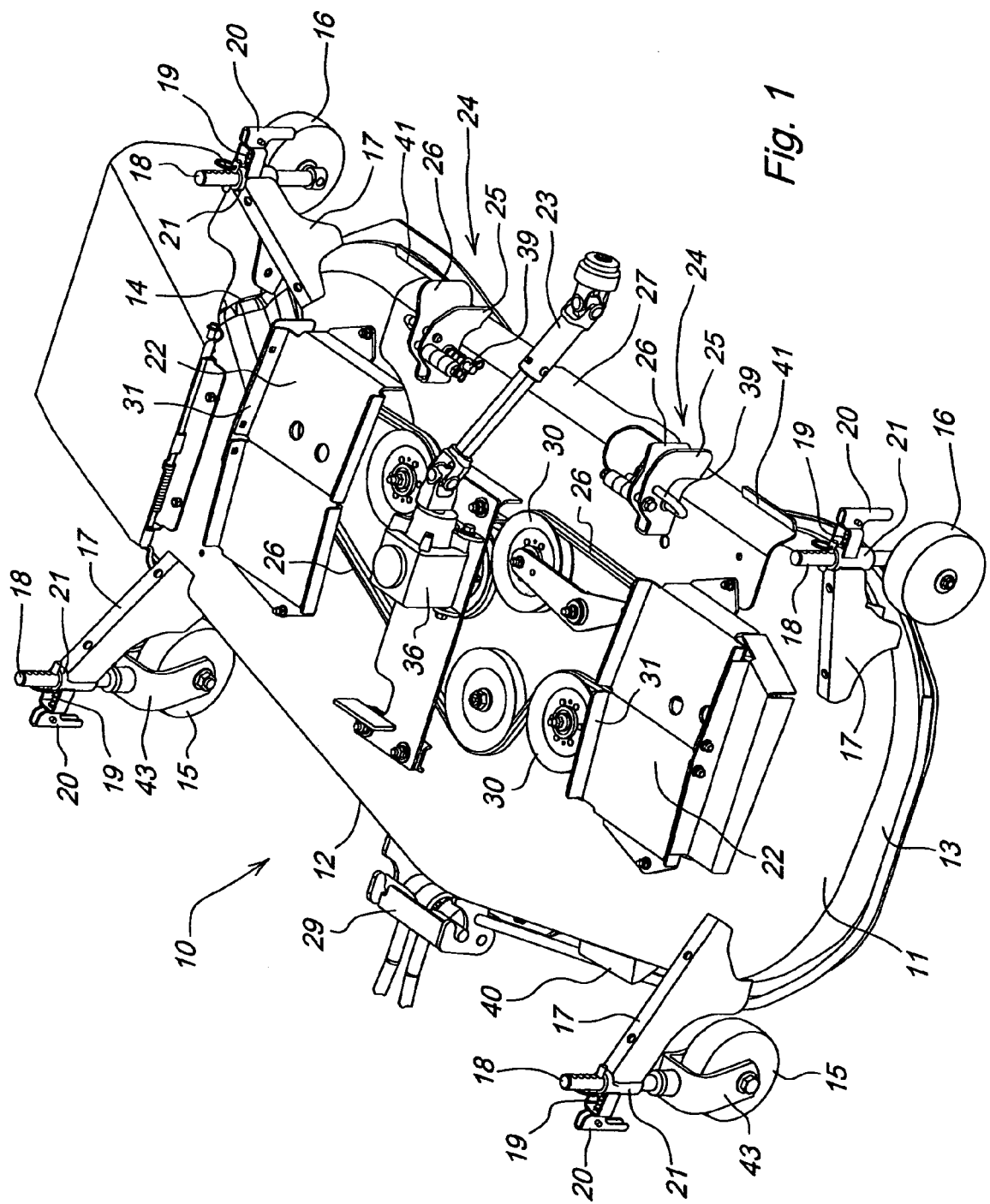
FIG. 1 is a top perspective view of a drive over mower deck in a raised position in a first embodiment of the invention.
Figure 2:
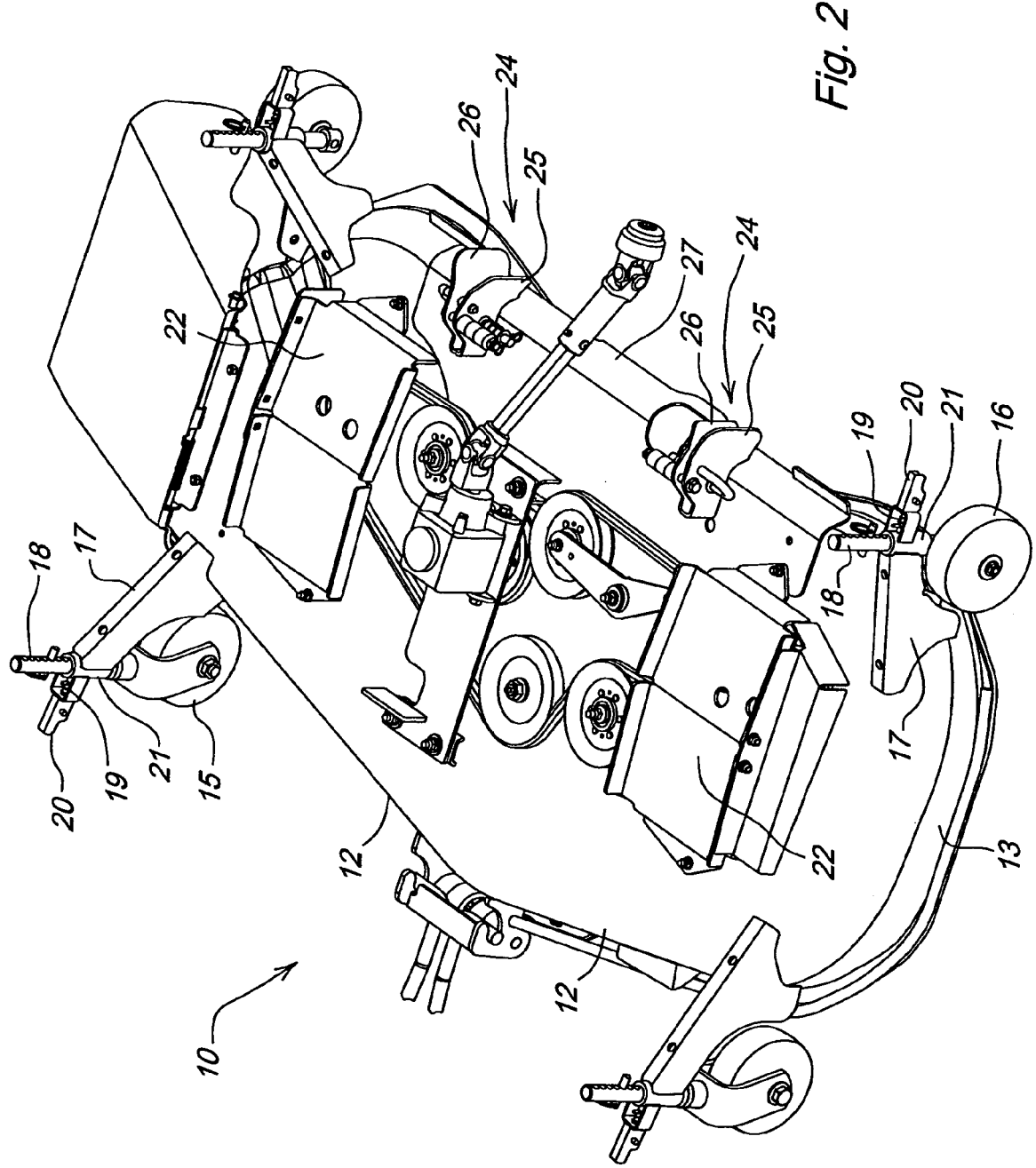
FIG. 2 is a top perspective view of a drive over mower deck in a lowered position flat on the ground according to a first embodiment of the invention.

As shown in FIGS. 1 and 2, in one embodiment, drive over mower deck 10 may cover a plurality of rotary cutting blades, and preferably three cutting blades, mounted on the lower ends of vertically oriented spindles. Alternatively, the drive over mower deck may cover two cutting blades, or more than three cutting blades. The drive over mower deck may have a top surface 11, a front facing edge 12 with a rim, left and right side edges 13, 14, and a back edge 27. The drive over mower deck may have a total width greater than the track width of at least one set of wheels of a tractor or utility vehicle, and may be mid-mounted under the tractor or vehicle frame between the front and rear wheels.

Figure 3:
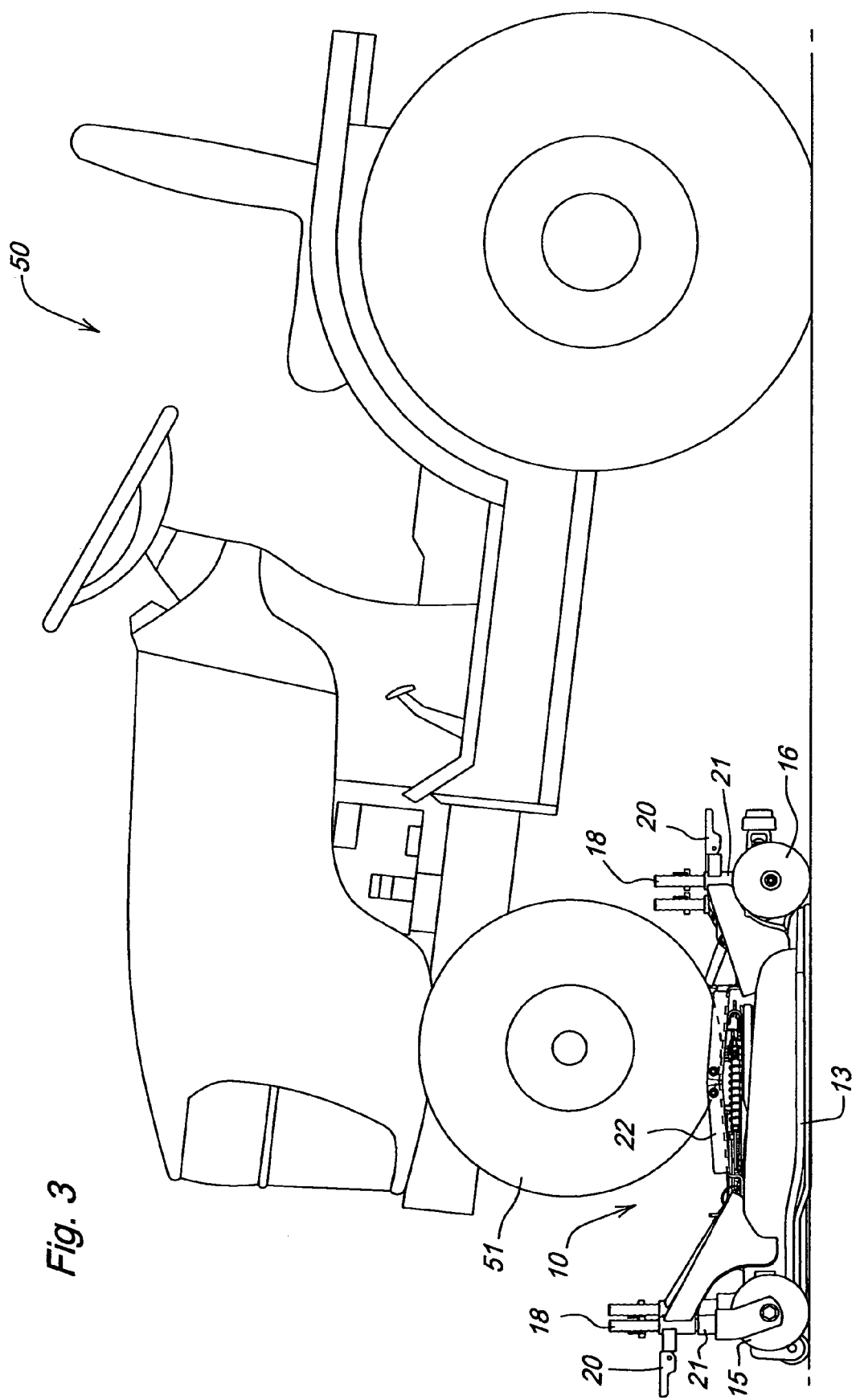
FIG. 3 is a side view of a tractor on the drive over mower deck of the first embodiment.

In one embodiment, drive over mower deck 10 may have a first pair of gauge wheels 15 mounted adjacent the front edge of the deck, and a second pair of gauge wheels 16 mounted adjacent the rear edge of the deck. In a cutting position, as shown in FIG. 1, the mower deck may be at least partially supported by the gauge wheels, and/or the gauge wheels may be positioned to avoid or reduce scalping of turf by the mower blades. In a drive over position, as shown in FIGS. 2 and 3, the gauge wheels 15, 16 may be retracted sufficiently so that the deck is not supported by the gauge wheels. Optionally, in the embodiment shown, front gauge wheels 15 may be caster wheels.

In one embodiment, each front gauge wheel 15 may be mounted in a swivel frame 43 which may be rotatably coupled to a gauge wheel shaft 18. Each rear gauge wheel 16 also may be rotatably coupled to a gauge wheel shaft 18. Gauge wheel shafts 18 may be inserted in and through gauge wheel tubes 21. The gauge wheel tubes may be welded or otherwise secured to a gauge wheel brackets 17.

In one embodiment, each gauge wheel may be extended to any of one or more selected cutting heights, or retracted to a drive-over position, by moving the gauge wheel vertically. For example, each gauge wheel may be moved vertically by sliding the gauge wheel shaft 18 in the gauge wheel tube 21. In the drive-over position, as shown in FIGS. 2 and 3, each gauge wheel shaft 18 may slide upward with respect to gauge wheel tube 21 to at least one position where the mower deck lies flat on the ground surface. In the drive-over position, the front, back and side edges and/or rims of the deck may lie flat on the ground surface. To move the mower deck to a mowing position, as shown in FIG. 1, each gauge wheel shaft 18 may slide downward with respect to the gauge wheel tube 21 until the front, back and side edges and/or rims are spaced above the ground surface at a desired cutting height.

In one embodiment, each gauge wheel may be connected to the mower deck through gauge wheel bracket 17. Each gauge wheel bracket 17 may be attached to the mower deck at a position adjacent to a corner of the deck; i.e., between each side rim and the front and back rims. Gauge wheel brackets 17 may project and extend sufficiently over the top surface 11 of the mower deck so that each gauge wheel may be raised sufficiently so that it does not support the weight of the deck. For example, each gauge wheel tube 21 may allow the gauge wheel shaft 18 to move vertically upwardly sufficiently so that gauge wheels 15, 16 are above the edge or rim of the deck. When all of the gauge wheels are raised or otherwise retracted to the drive-over position, the mower deck may lie flat on the ground, and the front, back, and left and right side edges and/or rims of the deck may rest on the ground surface.

In one embodiment, each gauge wheel shaft 18 may be held and/or locked in at least two different positions with respect to gauge wheel tube 21. For example, each gauge wheel shaft 18 may have a plurality of holes 44, or openings or detents, that correspond to each possible position or height of the drive over deck with respect to the ground surface. In the embodiment of FIGS. 1 and 2, gauge wheel pins 19 may be inserted through selected holes in the gauge wheel shafts 18 to hold and lock the gauge wheel shafts at a specified height.

Figure 4:
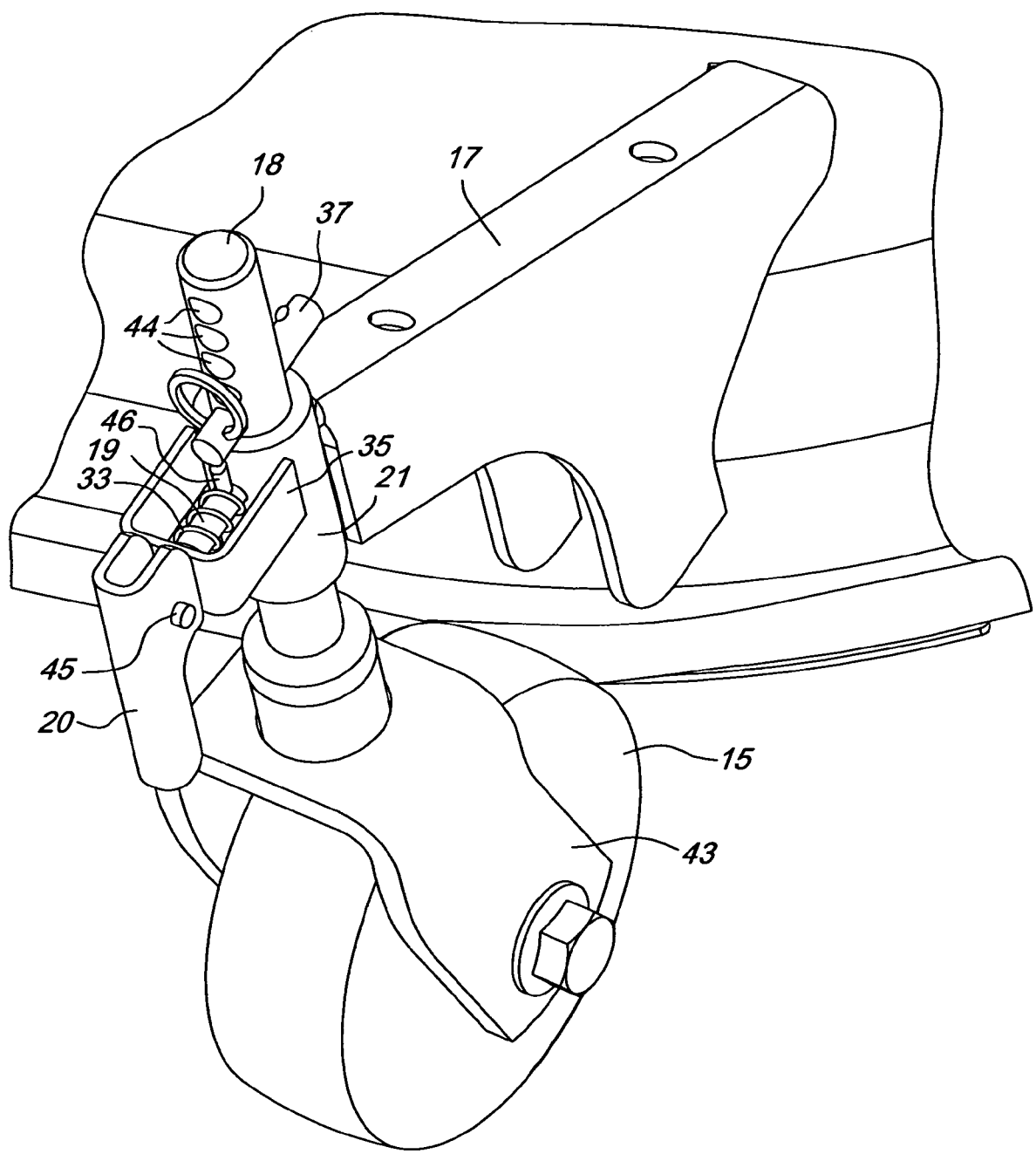
FIG. 4 is a top perspective view of a gauge wheel assembly according to a first embodiment of the invention.

Now referring to FIG. 4, in one embodiment, each gauge wheel pin 19 may be part of a locking assembly including cam lever 20 and spring 33. The locking assembly may allow gauge wheel pin 19 to be engaged and disengaged from the gauge wheel shaft 18 at each deck height. The gauge wheel pin 19 may be captured by a hole in gauge wheel tube 21 and a corresponding hole in U-shaped member 35 connected to gauge wheel tube 21. Cam lever 20 and spring 33 may work together to maintain engagement of gauge wheel pin 19 with gauge wheel shaft 18. Cam lever may be connected to gauge wheel pin 19 by roll pin 45 or a similar pivoting member, and spring may be retained on gauge wheel pin 19 using roll pin 46 in a hole perpendicular to the axis of pin 19, or a similar small retainer. Spring 33 may push against roll pin 46 and the inside surface of U-shaped member 35 to maintain engagement. Spring 33 may push roll pin 46 or a small retainer against the outside surface of gauge wheel tube 21 at the point of maximum pin engagement.

In one embodiment, cam lever 20 may assist engagement or disengagement of each gauge wheel pin 19 through the use of mechanical advantage. Cam lever 20 may use the surface of U-shaped member 35 as a plane for the lobe of the cam lever to push against while disengaging the gauge wheel pin 19. The gauge wheel pin may be in the engaged position when the cam lever is in its lowest position and, as the cam lever is rotated to its highest position, the gauge wheel pin may move to a disengaged position. The cam lever will remain at the highest position until moved back to the lowest position to reengage the gauge wheel pin.

In one embodiment, memory pin 37 may work in conjunction with each gauge wheel pin 19 to allow the operator to return to a previously set cutting height after the drive over mower deck has been removed from or attached to the tractor. The memory pin may limit vertical travel of gauge wheel shaft 18 with respect to the gauge wheel tube 21. The memory pin 37 may be inserted into one of the holes 44 or openings in gauge wheel shaft 18 above the gauge wheel tube 21 corresponding to a previously set cutting height. When the deck is lifted off of the ground with the gauge wheel pin 19 disengaged, the gauge wheel and gauge wheel shaft will fall until the memory pin rests against the top of the gauge wheel tube. This positions the gauge wheel shaft at the desired cutting height and allows the gauge wheel pin to be engaged, thus locking the gauge wheel shaft at the desired position. After engaging the gauge wheel pin with the cam lever, the deck will be placed at the previously set cutting height.

In one embodiment, at least one drive over belt shield 22 may be mounted on the top surface of the mower deck to function like a bridge or ramp over belts 26 and pulleys 30 on the deck's upper surface that are connected to power take off shaft 23 and gear box to drive the cutting blades. Preferably, a pair of drive over belt shields are mounted on the mower deck, although a single drive over belt shield may be used, that may be wide enough to accommodate the left and right tires of a tractor. As shown in FIG. 3, each of the pair of drive over belt shields 22 may mount to the top surface of deck 10 in a position that protects working components of the deck from the weight of tractor 50, including the tractor front tires 51 (or rear tires) while driving over the deck. The drive over belt shields may be mounted to the deck in a manner to help distribute the weight of tractor 50 or vehicle to the outer edges of the deck where the deck may provide the most strength, especially if the deck is made of lighter weight steel. For example, the drive over belt shield(s) may be attached to a lighter weight mower deck at front and rear mounting points less than about 12 inches from the front and back edges rims of the deck.

In one embodiment, the drive over belt shield(s) 22 may be fastened to the deck in a manner that allows their removal for servicing working components on the deck. For example, the drive over belt shield(s) 22 may have access holes to provide for application of grease or oil to service the pulleys and other components under the shields. Optionally, one or both lateral sides of belt shield(s) 22 may be provided with a wall 31. The walls 31 or inner upward edges of the belt shield(s) may act as guides for the front tires, to help guide the rear lift arms into rear draft brackets 24 as the tractor drives over the deck.

In one embodiment, rear draft brackets 24 may be mounted on the top surface or back rim of the drive over mower deck. Each rear draft bracket may include two plates 25, 26 mounted perpendicular to the top surface of the deck. Plates 25, 26 may be spaced apart from each other sufficiently to allow insertion of a rear draft arm between them. The rear edges of each plate may be angled or bent outwardly, so that the rear draft arm may be funneled between the plates into the rear draft bracket, after the tractor has driven over the deck. The rear draft arms mounted on a tractor may engage the rear draft brackets. Each rear draft bracket may have a pin 39 that intersects or extends between the two plates. The pin may correspond with a notch in the rear draft arms. The notch in the rear draft arms may work like a hook to catch pin 39 as the rear draft arms are engaged in the bracket. Once both sides are hooked and fully engaged, the mounting holes in the deck and the lift kit may be lined up and are ready for insertion of retaining pins. The front edge of the deck also may be provided with an attachment member 29 that may be hooked onto the lift system of the tractor or vehicle.

In one embodiment, the drive over deck may include a pair of front cleats 40 projecting forwardly from the front edge or rim of the deck, preferably positioned between the front rim and top surface of the deck. Front cleats 40 may be positioned to engage the front or rear tires of a tractor before the tires contact the rim or top surface of the mower deck. Additionally, in one embodiment, the drive over deck may include a pair of rear cleats 41 projecting rearwardly from the back edge or rim of the deck, preferably positioned between the back rim and top surface of the deck. Rear cleats 41 also may be positioned to engage the front or rear tires of the tractor before the tires contact the rim or top surface of the mower deck. The front and rear cleats help hold and secure the deck in a stationary position on the ground surface while the tractor begins to drive over the mower deck, or drive off from the mower deck. The cleats help prevent the mower deck from sliding forward when a tractor drives over it.

Having described the preferred embodiment, it will become apparent that various modifications can be made without departing from the scope of the invention as defined in the accompanying claims.

The invention claimed is:

1. An apparatus comprising:
    a mower deck covering a plurality of rotary cutting blades driven by pulleys and at least one belt over the top surface of the deck; the deck having a front edge, a back edge, and left and right side edges;
    a plurality of gauge wheels at the edges of the mower deck, each gauge wheel mounted under a vertically slidable gauge wheel shaft, each gauge wheel shaft slidable to a plurality of vertical positions including at least one position in which the front edge, back edge, and left and right side edges of the mower deck lie flat on the ground surface;
    each gauge wheel shaft having a cam lever associated therewith to releasably lock the gauge wheel shaft at a desired position;
    at least one shield mounted to the top surface of the deck over at least a portion of the pulleys and belts and dimensioned to support the tires of a tractor;
    wherein each shield has a front mounting spaced at least 12 inches from a rear mounting.

2. The apparatus of claim 1 wherein each gauge wheel shaft has a plurality of holes to define a plurality of vertical positions.

3. The apparatus of claim 1 wherein the mower deck covers three rotary cutting blades.

4. The apparatus of claim 1 the further comprising a gauge wheel tube within which each gauge wheel shaft slides.

5. The apparatus of claim 4 further comprising four brackets attached to the rim of the deck and extending upwardly from the top surface of the deck, each bracket attached to a gauge wheel tube.

6. The apparatus of claim 1 further comprising a pair of rearwardly facing rear draft brackets, each draft bracket having two outwardly diverging plates.

7. A drive over mower deck comprising:
    a top surface with downwardly depending surfaces defining a front edge, a back edge, and left and right side edges;
    at least one belt shield over the top surface;
    a first pair of gauge wheels mounted adjacent the front edge of the deck, and a second pair of gauge wheels mounted adjacent the back edge of the deck;
    each pair of gauge wheels being movable vertically to at least one position above the ground surface such that the mower deck is supported by the front edge, back edge, and left and right side edges;
    each gauge wheel being releasably lockable at a plurality of different positions; and
    at least one pair of cleats extending from the front edge or back edge of the deck engageable with the tires of a vehicle.

8. The drive over mower deck of claim 7 further comprising a pair of rear draft brackets attached to the mower deck adjacent the back edge thereof, each rear draft bracket having a pair of plates, each plate curved outwardly from the opposing plate facing the back rim.

9. The drive over mower deck of claim 7 wherein the first pair of gauge wheels are caster wheels.

10. The drive over mower deck of claim 7 wherein each gauge wheel is releasably lockable by a pin attached to a cam lever.

11. The drive over mower deck of claim 7 further comprising a plurality of gauge wheel brackets, each bracket attached to the mower deck and supporting a gauge wheel.

* * * * *